US012563483B2

(12) United States Patent
Hietalahti

(10) Patent No.: US 12,563,483 B2
(45) Date of Patent: Feb. 24, 2026

(54) PLMN SELECTION BASED ON THE GEO-LOCALISATION OF A USER EQUIPMENT

(71) Applicant: NOKIA TECHNOLOGIES OY, Espoo (FI)

(72) Inventor: Hannu Hietalahti, Kiviniemi (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 867 days.

(21) Appl. No.: 17/641,394

(22) PCT Filed: Sep. 28, 2020

(86) PCT No.: PCT/IB2020/059057
§ 371 (c)(1),
(2) Date: Mar. 8, 2022

(87) PCT Pub. No.: WO2021/064549
PCT Pub. Date: Apr. 8, 2021

(65) Prior Publication Data
US 2022/0303887 A1 Sep. 22, 2022

(30) Foreign Application Priority Data
Oct. 3, 2019 (GB) ..................................... 1914309

(51) Int. Cl.
*H04W 48/04* (2009.01)
*H04W 48/18* (2009.01)
(Continued)

(52) U.S. Cl.
CPC ........... *H04W 48/18* (2013.01); *H04W 48/04* (2013.01); *H04W 60/04* (2013.01); *H04W 84/042* (2013.01)

(58) Field of Classification Search
CPC ..... H04W 48/18; H04W 48/16; H04W 48/04; H04W 60/00; H04W 60/04; H04W 84/042; H04W 8/205; H04W 84/06; H04W 8/20
See application file for complete search history.

(56) References Cited

U.S. PATENT DOCUMENTS

2005/0037753 A1 2/2005 Andersen et al.
2006/0223497 A1* 10/2006 Gallagher ............. H04W 12/08
455/410
(Continued)

FOREIGN PATENT DOCUMENTS

CN 103222309 A 7/2013
CN 104303564 A 1/2015
(Continued)

OTHER PUBLICATIONS

First Examination Report for Indian Application No. 202247024744 dated Aug. 26, 2022, 7 pages.
(Continued)

*Primary Examiner* — Marcus Hammonds
(74) *Attorney, Agent, or Firm* — ALSTON & BIRD LLP

(57) ABSTRACT

A method comprises when a user equipment has moved from a first geographic territory to a second geographic territory, causing the user equipment to move from a first public land mobile network associated with the first geographic territory to a second public land mobile network associated with the second geographic territory.

21 Claims, 8 Drawing Sheets

(51) Int. Cl.
  *H04W 60/04*  (2009.01)
  *H04W 84/04*  (2009.01)

(56)      References Cited

U.S. PATENT DOCUMENTS

| | | | |
|---|---|---|---|
| 2007/0298801 A1 | 12/2007 | Kim et al. | |
| 2008/0318571 A1* | 12/2008 | Vikberg | H04W 60/04 |
| | | | 455/435.2 |
| 2010/0265893 A1* | 10/2010 | Dwyer | H04W 8/06 |
| | | | 370/329 |
| 2013/0225120 A1 | 8/2013 | Hietalahti et al. | |
| 2014/0045488 A1 | 2/2014 | Cheng | |
| 2015/0072679 A1 | 3/2015 | Wirtanen et al. | |
| 2015/0099551 A1 | 4/2015 | Bohaty | |
| 2015/0351013 A1* | 12/2015 | Zhang | H04W 48/18 |
| | | | 370/328 |
| 2016/0316512 A1 | 10/2016 | Dandra et al. | |
| 2017/0055201 A1 | 2/2017 | Murray et al. | |
| 2017/0127371 A1 | 5/2017 | Jiang et al. | |
| 2018/0007620 A1 | 1/2018 | Kim et al. | |
| 2018/0020417 A1 | 1/2018 | Catovic et al. | |
| 2020/0092798 A1 | 3/2020 | Abraham et al. | |
| 2020/0322879 A1 | 10/2020 | Zhu et al. | |
| 2020/0404577 A1 | 12/2020 | Wu et al. | |

FOREIGN PATENT DOCUMENTS

| | | |
|---|---|---|
| CN | 106465248 A | 2/2017 |
| CN | 106470455 A | 3/2017 |
| CN | 106851786 A | 6/2017 |
| CN | 107182047 A | 9/2017 |
| CN | 109479252 A | 3/2019 |
| CN | 109951877 A | 6/2019 |
| CN | 110225464 A | 9/2019 |
| IN | 201817045596 A | 2/2019 |
| JP | 2010-268249 A | 11/2010 |
| JP | 2013-197729 A | 9/2013 |
| JP | 2015-505187 A | 2/2015 |
| WO | WO 2007/083212 A1 | 7/2007 |
| WO | WO 2017/067568 A1 | 4/2017 |
| WO | 2018/013405 A1 | 1/2018 |
| WO | WO 2018/110719 A1 | 6/2018 |

OTHER PUBLICATIONS

3rd Generation Partnership Project; Technical Specification Group Services and System Aspects; System Architecture for the 5G System (5GS); Stage 2 (Release 16), 3GPP TS 23.501 v16.2.0, (Sep. 2019), 391 pages.

Nokia et al., "New Solution for the PLMN Selection Part of Key Issue #10", SA WG2 Meeting #136, S2-1911515, (Nov. 18-22, 2019), 4 pages.

Office Action for Japanese Application No. 2022-520666 dated Jun. 29, 2023, 9 pages.

Vodafone, "Solution: Regulatory Services with Super-National Satellite Ground Station", SA WG2 Meeting #S2-135, S2-1909848, (Oct. 14-18, 2019), 4 pages.

"3rd Generation Partnership Project; Technical Specification Group Core Network and Terminals; Non-Access-Stratum (NAS) functions related to Mobile Station (MS) in idle mode (Release 16)", 3GPP TS 23.122 v16.3.0, (Sep. 2019), 75 pages.

"3rd Generation Partnership Project; Technical Specification Group Radio Access Network; Solutions for NR to Support Non-Terrestrial Networks (NTN) (Release 16)", 3GPP TR 38.821 v0.7.0, (May 2019), 86 pages.

"3rd Generation Partnership Project; Technical Specification Group Services and System Aspects; Study on Architecture Aspects for Using Satellite Access in 5G (Release 17)", 3GPP TR 23.737 v2.0.0, (Dec. 2019), 84 pages.

International Search Report and Written Opinion for Patent Cooperation Treaty Application No. PCT/IB2020/059057 dated Dec. 4, 2020, 18 pages.

Search Report for United Kingdom Application No. GB1914309.8 dated Feb. 9, 2021, 2 pages.

Office Action for Japanese Application No. 2022-520666 dated Jan. 29, 2024, 7 pages.

Office Action for Chinese Application No. 202080069829.0 dated Jan. 19, 2024, 11 pages.

Office Action for Indonesian Application No. P00202204125 dated Mar. 25, 2024, 5 pages.

Office Action for European Application No. 20789267.0 dated Jun. 20, 2024, 6 pages.

Office Action for Indonesian Application No. P00202204125 dated Jul. 16, 2024, 4 pages.

Office Action for Japanese Application No. 2022-520666 dated Aug. 19, 2024, 4 pages.

Office Action for Indonesian Application No. P00202204125 dated Oct. 18, 2024, 4 pages.

Hearing Adjournment Notice for Indian Application No. 202247024744 dated Jun. 27, 2025, 3 pages.

Hearing Notice for Indian Application No. 202247024744 dated May 29, 2025, 3 pages.

Office Action for Indonesian Application No. P000202204125 dated May 14, 2025, 4 pages.

Office Action for Vietnamese Application No. 1-2022-02743 dated Jun. 27, 2025, 3 pages.

"Draft TR 38.821 v0.7.0; 3rd Generation Partnership Project; Technical Specification Group Radio Access Network; Solutions for NR to support non terrestrial networks (NTN) (Release 16)", R3-193293, (May 2019), 91 pages.

Decision to Grant for Chinese Application No. 202080069829.0 dated Oct. 17, 2024, 14 pages.

Decision to Grant for Japanese Application No. 2022-520666 dated Oct. 15, 2024, 4 pages.

Ericsson et al., "Cases of #17 to trigger redirection", 3GPP TSG-CT WG1 Meeting #85, Change Request CR 2481, C1-135200, (Nov. 11-15, 2013), 9 pages.

Interdigital, "S3-191770 was S3-191597; New KI for Public network integrated NPN", 3GPP TSG-SA WG3 Meeting #95, S3-191770, (May 6-10, 2019), 2 pages.

Office Action for Indonesian Application No. P00202204125 dated Mar. 13, 2025, 4 pages.

Office Action for Malaysian Application No. PI 2022001703 dated Apr. 24, 2025, 5 pages.

Vivo, "Inform UE of LAND availability area", 3GPP TSG-CT WG1 Meeting #106, C1-173883, (Oct. 23-27, 2017), 4 pages.

\* cited by examiner

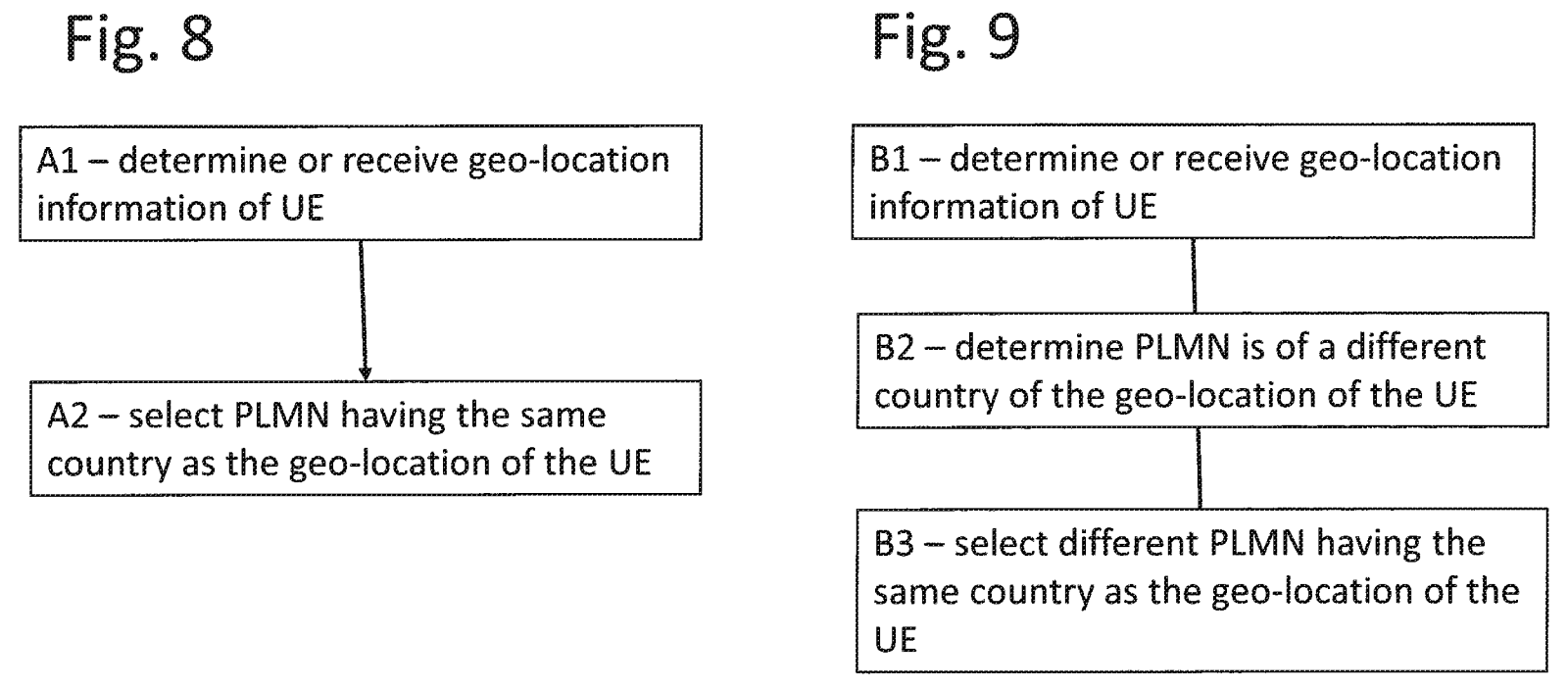

B1 – determine or receive geo-location information of UE

B2 – determine PLMN is of a different country of the geo-location of the UE

B3 – select different PLMN having the same country as the geo-location of the UE

Fig. 8

A1 – determine or receive geo-location information of UE

A2 – select PLMN having the same country as the geo-location of the UE

Fig. 10

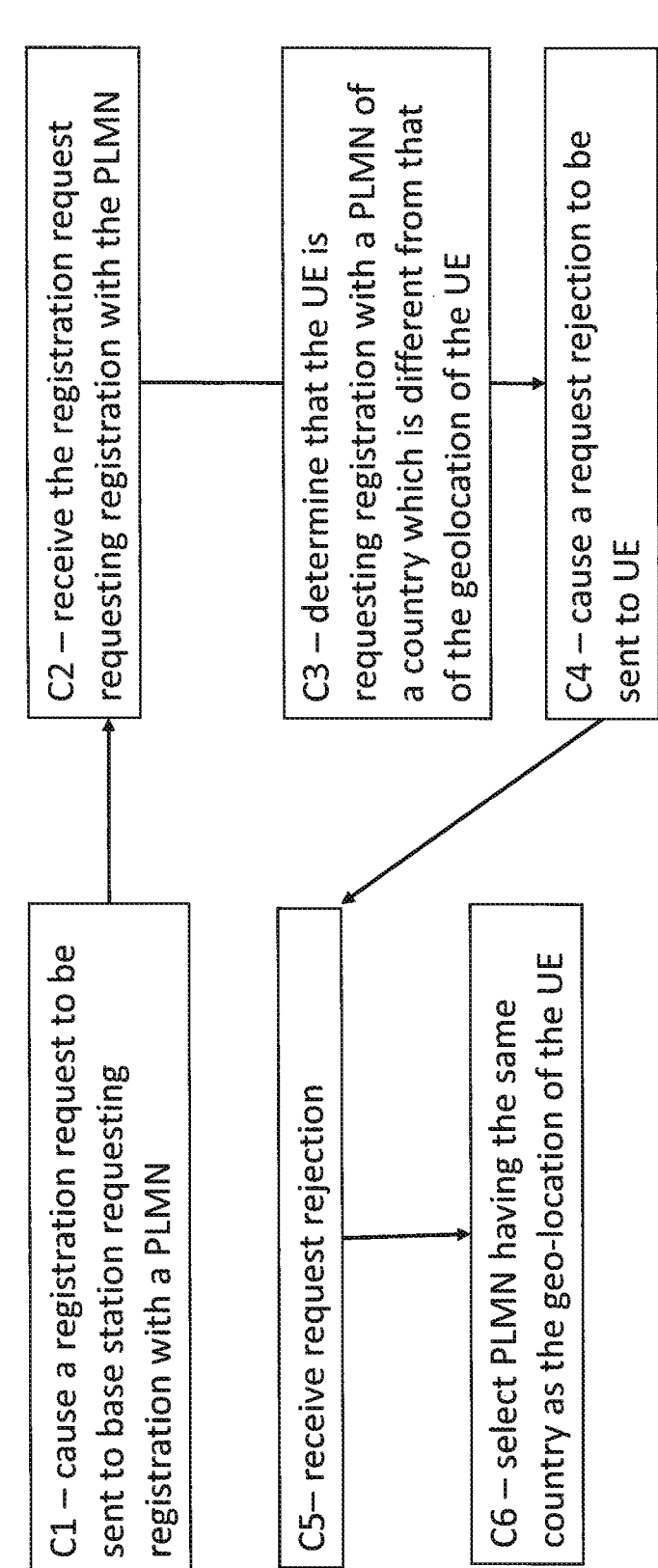

C1 – cause a registration request to be sent to base station requesting registration with a PLMN C2 – receive the registration request requesting registration with the PLMN C3 – determine that the UE is requesting registration with a PLMN of a country which is different from that of the geolocation of the UE C4 – cause a request rejection to be sent to UE C5– receive request rejection C6 – select PLMN having the same country as the geo-location of the UE E1 When a user equipment has moved from a first geographic territory to a second geographic territory, causing the user equipment to move from a first public land mobile network associated with the first geographic territory to a second public land mobile network associated with the second geographic territory.

Fig. 12

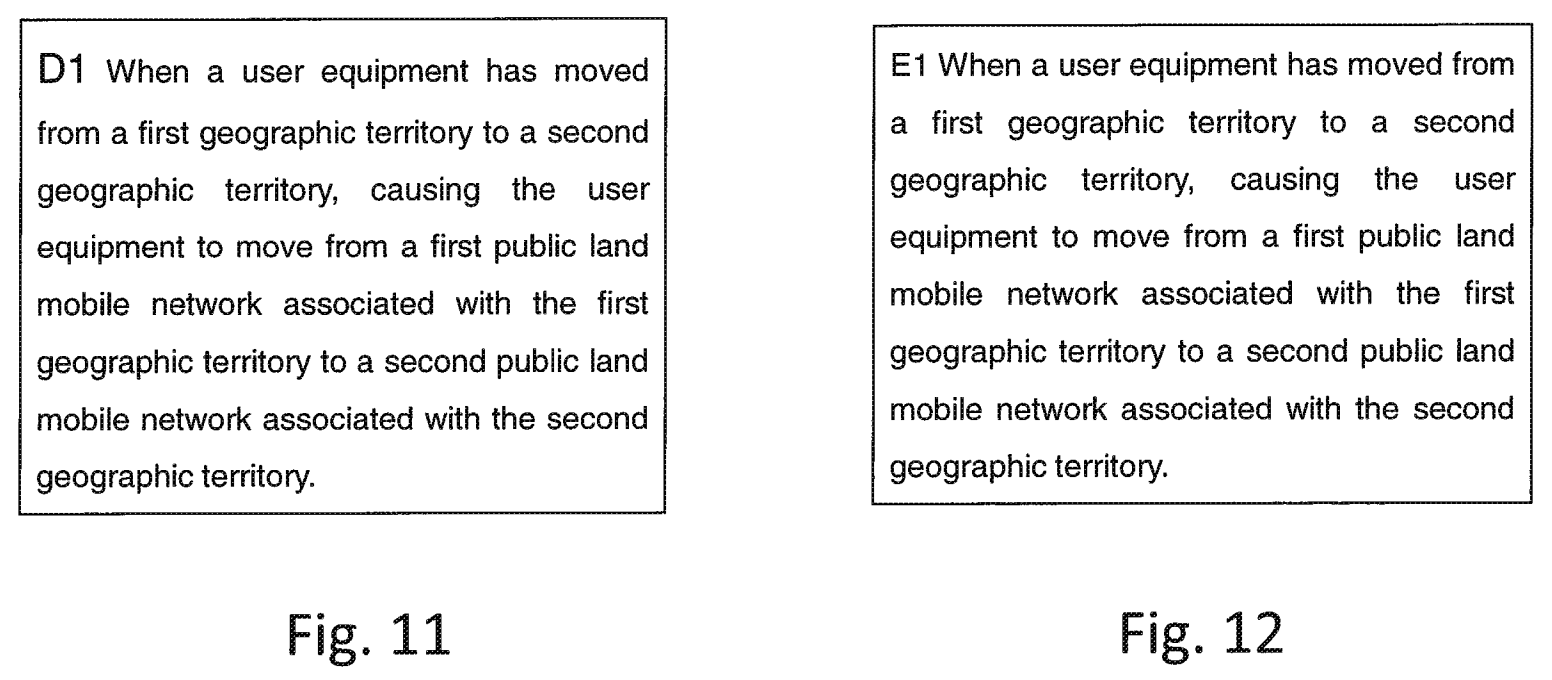

D1 When a user equipment has moved from a first geographic territory to a second geographic territory, causing the user equipment to move from a first public land mobile network associated with the first geographic territory to a second public land mobile network associated with the second geographic territory.

Fig. 11

PLMN SELECTION BASED ON THE GEO-LOCALISATION OF A USER EQUIPMENT

CROSS-REFERENCE TO RELATED APPLICATIONS

This application is a national phase entry of International Application No. PCT/IB2020/059057, filed Sep. 28, 2020, which claims priority to Great Britain Patent Application No. 1914309.8, filed Oct. 3, 2019, the entire contents of which are incorporated herein by reference.

FIELD OF THE DISCLOSURE

The present disclosure relates to an apparatus, a method, and a computer program and in particular but not exclusively for apparatus, methods and computer programs for selection of a network.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided a method comprising: when a user equipment has moved from a first geographic territory to a second geographic territory, causing the user equipment to move from a first public land mobile network associated with the first geographic territory to a second public land mobile network associated with the second geographic territory.

The method may comprise determining that the user equipment has moved from the first geographic territory to the second geographic territory The causing may comprise sending a request to register or to attach to said first public land mobile network.

The causing may comprise selecting the second public land mobile network from one or more candidate public land mobile networks, each of said one or more candidate public land mobile networks being associated with the second geographic territory.

The causing may comprise receiving a message comprising one or more candidate public land mobile networks.

The one or more candidate public land mobile networks may be associated with the second geographic territory.

The one or more candidate public land mobile networks may be associated with priority information.

The method may comprise attempting to select a candidate public land mobile network having a highest priority as the second public land mobile network The causing may comprise causing comprises receiving a message comprising second geographic territory information.

The method may comprise receiving validity information associated with one or more of said candidate public land mobile networks.

Where the second public land mobile network is associated with validity information, the method may comprise stopping use of the second public land mobile network at an end of a validity period associated with the validity information.

The causing may comprise using said second geographic territory information to select said second public land mobile network.

The message may comprise a registration rejection message.

The first public land mobile network may comprise a home public land mobile network.

At least one of the first and second public land mobile networks may use a satellite access technology.

The geographic territory may comprises a country.

The method may comprise preventing selection of a second public land mobile network using a respective radio access technology type.

The respective access technology type may be a satellite radio access technology type.

The method may be performed by an apparatus in a user equipment. The method may be performed by a user equipment.

According to an aspect, there is provided an apparatus comprising at least one processor and at least one memory including computer code for one or more programs, the at least one memory and the computer code configured, with the at least one processor, to cause the apparatus at least to: when a user equipment has moved from a first geographic territory to a second geographic territory, causing the user equipment to move from a first public land mobile network associated with the first geographic territory to a second public land mobile network associated with the second geographic territory.

The at least one memory and the computer program code may be configured to, with the at least one processor, cause the apparatus at least to determine that the user equipment has moved from the first geographic territory to the second geographic territory The at least one memory and the computer program code may be configured to, with the at least one processor, cause the apparatus at least to send a request to register or to attach to said first public land mobile network.

The at least one memory and the computer program code may be configured to, with the at least one processor, cause the apparatus at least to select the second public land mobile network from one or more candidate public land mobile networks, each of said one or more candidate public land mobile networks being associated with the second geographic territory.

The at least one memory and the computer program code may be configured to, with the at least one processor, cause the apparatus at least to receive a message comprising one or more candidate public land mobile networks.

The one or more candidate public land mobile networks may be associated with the second geographic territory.

The one or more candidate public land mobile networks may be associated with priority information.

The at least one memory and the computer program code may be configured to, with the at least one processor, cause the apparatus at least to attempt to select a candidate public land mobile network having a highest priority as the second public land mobile network The at least one memory and the computer program code may be configured to, with the at least one processor, cause the apparatus at least to receive a message comprising second geographic territory information.

The at least one memory and the computer program code may be configured to, with the at least one processor, cause the apparatus at least to receive validity information associated with one or more of said candidate public land mobile networks.

Where the second public land mobile network is associated with validity information, the at least one memory and the computer program code may be configured to, with the at least one processor, cause the apparatus at least to stop use of the second public land mobile network at an end of a validity period associated with the validity information.

The at least one memory and the computer program code may be configured to, with the at least one processor, cause the apparatus at least to use said second geographic territory information to select said second public land mobile network.

The message may comprise a registration rejection message.

The first public land mobile network may comprise a home public land mobile network.

At least one of the first and second public land mobile networks may use a satellite access technology.

The geographic territory may comprises a country.

The at least one memory and the computer program code may be configured to, with the at least one processor, cause the apparatus at least to prevent selection of a second public land mobile network using a respective radio access technology type.

The respective access technology type may be a satellite radio access technology type.

The apparatus may be provided in a user equipment. The apparatus may be a user equipment.

According to an aspect, there is provided an apparatus comprising means for: when a user equipment has moved from a first geographic territory to a second geographic territory, causing the user equipment to move from a first public land mobile network associated with the first geographic territory to a second public land mobile network associated with the second geographic territory.

The means may be for determining that the user equipment has moved from the first geographic territory to the second geographic territory.

The means may be for sending a request to register or to attach to said first public land mobile network.

The means may be for selecting the second public land mobile network from one or more candidate public land mobile networks, each of said one or more candidate public land mobile networks being associated with the second geographic territory.

The means may be for receiving a message comprising one or more candidate public land mobile networks.

The one or more candidate public land mobile networks may be associated with the second geographic territory.

The one or more candidate public land mobile networks may be associated with priority information.

The means may be for attempting to select a candidate public land mobile network having a highest priority as the second public land mobile network The means may be for causing comprises receiving a message comprising second geographic territory information.

The means may be for receiving validity information associated with one or more of said candidate public land mobile networks.

Where the second public land mobile network is associated with validity information, the means may be for stopping use of the second public land mobile network at an end of a validity period associated with the validity information.

The means may be for using said second geographic territory information to select said second public land mobile network.

The message may comprise a registration rejection message.

The first public land mobile network may comprise a home public land mobile network.

At least one of the first and second public land mobile networks may use a satellite access technology.

The geographic territory may comprises a country.

The means may be for preventing selection of a second public land mobile network using a respective radio access technology type.

The respective access technology type may be a satellite radio access technology type.

The apparatus may be provided in a user equipment. The apparatus may be a user equipment.

According to another aspect, there is provided a method comprising: when a user equipment has moved from a first geographic territory to a second geographic territory, determining in an apparatus in a network entity that a user equipment is to move from a first public land mobile network associated with the first geographic territory to a second public land mobile network associated with the second geographic territory.

The method may comprise determining that the user equipment has moved from the first geographic territory to the second geographic territory The method may comprise receiving from the user equipment a request to register or to attach to said first public land mobile network.

The method may comprise causing a message to be transmitted to the user equipment, said message comprising one or more candidate public land mobile networks.

The one or more candidate public land mobile networks may be associated with the second geographic territory.

The one or more candidate public land mobile networks may be associated with priority information.

The method may comprise causing validity information to be transmitted to the user equipment, said validity information associated with one or more of said candidate public land mobile networks.

The method may comprise causing second geographic territory information to be transmitted to the user equipment.

The message may comprise a registration rejection message.

The first public land mobile network may comprise a home public land mobile network.

At least one of the first and second public land mobile networks may use a satellite access technology.

The geographic territory may comprises a country.

The method may be performed by an apparatus in a network entity or by a network entity.

According to another aspect, there is provided an apparatus in a network entity comprising means for: when a user equipment has moved from a first geographic territory to a second geographic territory, determining that a user equipment is to move from a first public land mobile network associated with the first geographic territory to a second public land mobile network associated with the second geographic territory.

The means may be for determining that the user equipment has moved from the first geographic territory to the second geographic territory The means may be for receiving from the user equipment a request to register or to attach to said first public land mobile network.

The means may be for causing a message to be transmitted to the user equipment, said message comprising one or more candidate public land mobile networks.

The one or more candidate public land mobile networks may be associated with the second geographic territory.

The one or more candidate public land mobile networks may be associated with priority information.

The means may be for causing validity information to be transmitted to the user equipment, said validity information associated with one or more of said candidate public land mobile networks.

The means may be for causing second geographic territory information to be transmitted to the user equipment.

The message may comprise a registration rejection message.

The first public land mobile network may comprise a home public land mobile network.

At least one of the first and second public land mobile networks may use a satellite access technology.

The geographic territory may comprises a country.

According to an aspect, there is provided an apparatus in a network entity comprising at least one processor and at least one memory including computer code for one or more programs, the at least one memory and the computer code configured, with the at least one processor, to cause the apparatus at least to: when a user equipment has moved from a first geographic territory to a second geographic territory, determine that a user equipment is to move from a first public land mobile network associated with the first geographic territory to a second public land mobile network associated with the second geographic territory.

The at least one memory and the computer program code may be configured to, with the at least one processor, cause the apparatus at least to determine that the user equipment has moved from the first geographic territory to the second geographic territory The at least one memory and the computer program code may be configured to, with the at least one processor, cause the apparatus at least to receive from the user equipment a request to register or to attach to said first public land mobile network.

The at least one memory and the computer program code may be configured to, with the at least one processor, cause the apparatus at least to cause a message to be transmitted to the user equipment, said message comprising one or more candidate public land mobile networks.

The one or more candidate public land mobile networks may be associated with the second geographic territory.

The one or more candidate public land mobile networks may be associated with priority information.

The at least one memory and the computer program code may be configured to, with the at least one processor, cause the apparatus at least to cause validity information to be transmitted to the user equipment, said validity information associated with one or more of said candidate public land mobile networks.

The at least one memory and the computer program code may be configured to, with the at least one processor, cause the apparatus at least to cause second geographic territory information to be transmitted to the user equipment.

The message may comprise a registration rejection message.

The first public land mobile network may comprise a home public land mobile network.

At least one of the first and second public land mobile networks may use a satellite access technology.

The geographic territory may comprises a country.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which:

FIG. 8 shows a method of some embodiments;

FIG. 9 shows a method of some embodiments;

FIG. 10 shows a method of some embodiments;

FIG. 11 shows a method of some embodiments;

FIG. 12 shows a method of some embodiments.

DETAILED DESCRIPTION OF THE FIGURES

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As is known, wireless systems can be divided into cells, and are therefore often referred to as cellular systems. Typically, an access point such as a base station provides at least one cell. The cellular system can support communications between user equipment (UE).

In the following, different exemplifying embodiments will be described using, as an example of an access architecture to which the embodiments may be applied, a radio access architecture based on long term evolution advanced (LTE Advanced, LTE-A) or new radio (NR) (or can be referred to as 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS) or any combination thereof.

In the following certain embodiments are explained with reference to communications devices capable of communication via a wireless cellular system and communication systems serving such communications devices. Before explaining in detail the exemplifying embodiments, certain general principles of a wireless communication system, access systems thereof, and communications devices are briefly explained with reference to FIGS. 1 to 5 to assist in understanding the technology underlying the described examples.

Figure 1:
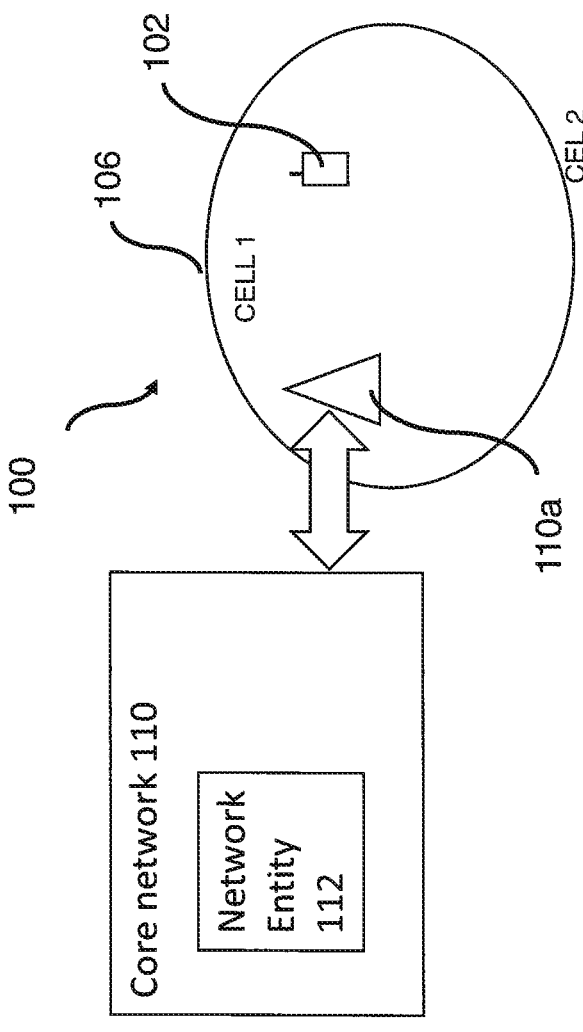
FIG. 1 shows a schematic diagram of an example communication system comprising a plurality of base stations and a communication device.

FIG. 1 which shows a cell of a wireless communication system 100. The cell is part of a public land mobile network PLMN. A PLMN is typically made up of a number of cells. As can be seen a communications device 102 is served by cell 1 106 which is provided by a first base station 110a which may be a gNB.

The communication devices will be referred to as a UE (user equipment) in this document but it should be appreciated that the device may be any suitable communications device and the term UE is intended to cover any such device. Some examples of communications devices are discussed below and as used in this document the term UE is intended to cover any one or more of those devices and/or any other suitable device. The communications devices have a wireless connection to a base station or other access point.

The base station is configured to communicate with a core network 110. The core network may one or more network entities 112.

Figure 2:
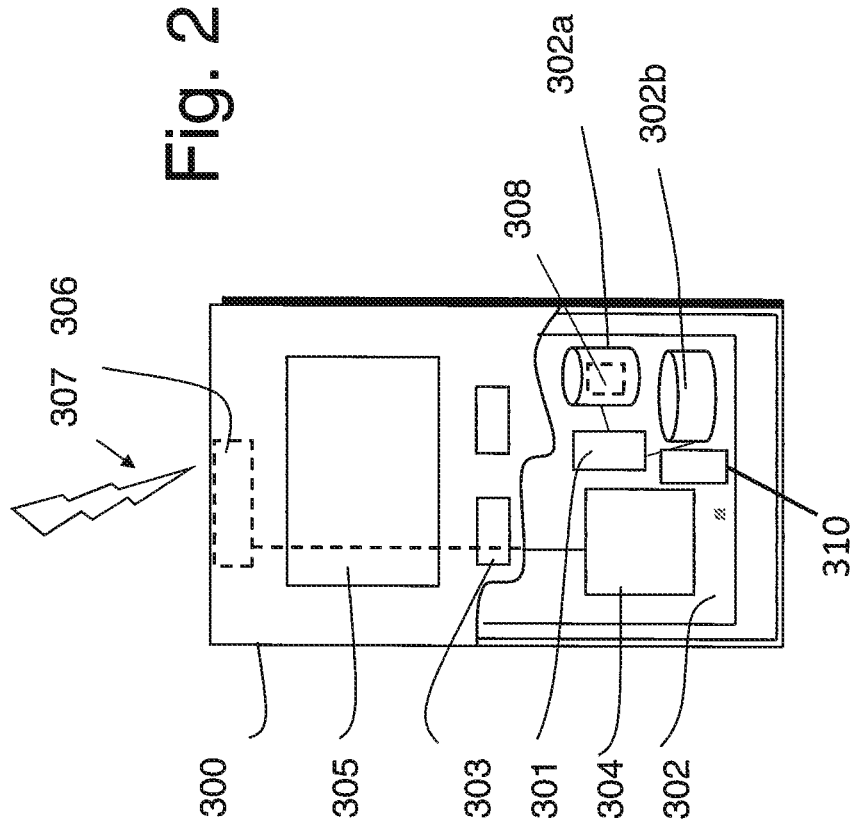
FIG. 2 shows a schematic diagram of an example mobile communication device.

FIG. 2 illustrates an example of a communications device 300, such as the wireless communications device 102 shown on FIG. 1. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the mobile device.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302a.

A geo-position sensor 310 may be provided for determining the geo-location of the communications device. This may use a satellite positioning technology and/or any other suitable technology. In some embodiments, the sensor may alternatively or at least partially provided by the at least one processor. Alternatively or additionally, the sensor may be provided by suitable hardware or circuitry.

Some embodiments may alternatively or additionally use a software based procedure to determine a geo-location.

Alternatively or additionally, some embodiments may use a communication-originated UE positioning method. For example in some embodiments, a user equipment may limit its background scanning of higher priority PLMNs to the candidate PLMNs of the same country as the RPLMN (registered PLMN), based on the MCC of the RPLMN. Thus in some embodiments, the UE's awareness of its own location may use a software algorithm and/or signalling procedure.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

Communication protocols and/or parameters which shall be used for the connection are also typically defined. The communications devices may access the communication system based on various access techniques.

Figure 3:
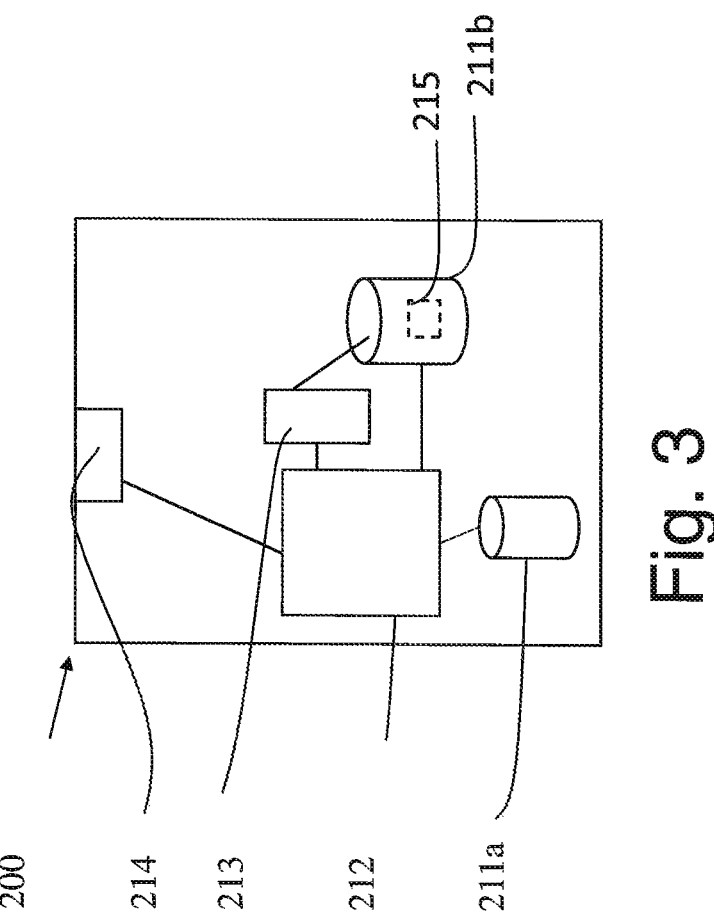
FIG. 3 shows a schematic diagram of an example apparatus provided in a network entity.

An example apparatus is shown in FIG. 3. FIG. 3 shows an example of an apparatus 200 for a network entity 112. The apparatus comprises at least one memory. The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Figure 4:
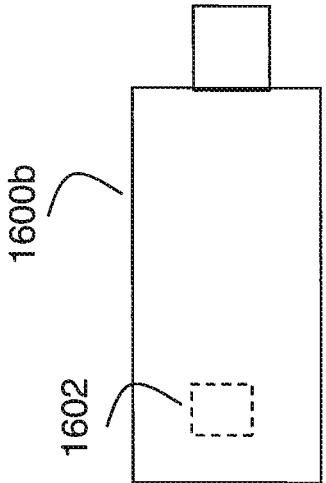
FIG. 4 shows a schematic representation of a non-volatile memory medium storing instructions which when executed by a processor allow a processor to perform one or more of the procedures of the method of some embodiments.
Figure 4:
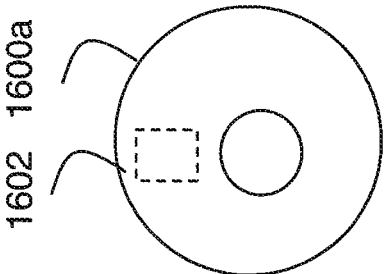

FIG. 4 shows a schematic representation of non-volatile memory media 1600a (e.g. computer disc (CD) or digital versatile disc (DVD)) and 1600b (e.g. universal serial bus (USB) memory stick) storing instructions and/or parameters 1602 which when executed by a processor allow the processor to perform any of the methods of any of the embodiments or a part of any of the methods of any of the embodiments.

Figure 5:
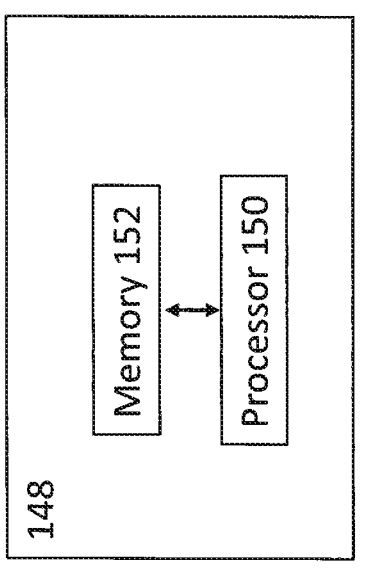
FIG. 5 shows an example apparatus which may be provided in a network entity or a communications device.

FIG. 5 shows an apparatus 148. The apparatus 148 may be provided in a network entity or in a communications device. The apparatus may comprise at least processor 150 and at least one memory 152 including computer code for one or more programs.

This apparatus may be configured to cause some embodiments to be performed.

Public authorities may set the regulatory requirements in each country, including the radio frequencies and channels to be used for mobile communication.

In order to respect a neighboring countries right to re-use a whole spectrum in their own territory, the network operators aim to avoid extending the coverage area of their mobile communication networks outside of the country that issued their operating license. The radio network may not be designed with sharp edges at country borders. However, it is an aim to ensure that the coverage area of each PLMN ends reasonably soon after crossing the border to another country.

Figure 6:
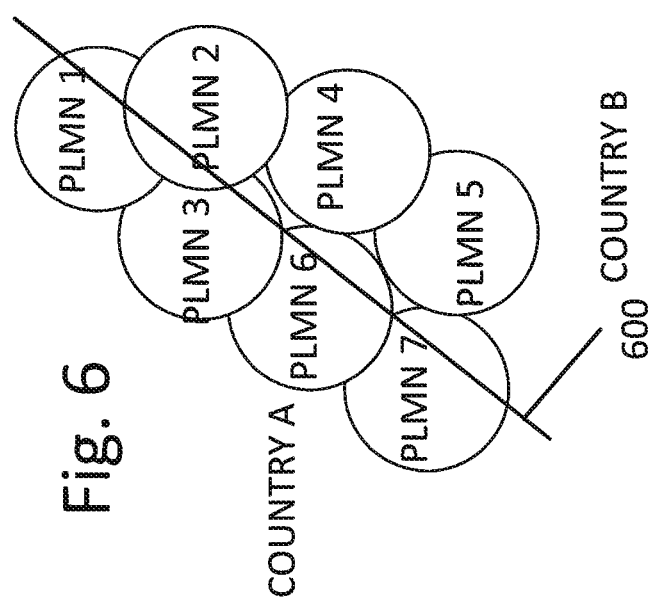
FIG. 6 shows schematically various land mobile network networks in two different countries.

In this regard, reference is made to FIG. 6 which schematically shows a PLMNs located along a border 600. PLMN 1, PLMN 3, PLMN 6 and PLMN 7 are provided by one or more operators in country A and PLMN 2, PLMN 4 and PLMN 5 are provided by one or more operators in country B. As schematically shown in FIG. 6 a PLMN provided by an operator in one country may provide cell coverage in another country.

Each mobile subscriber's access right to the network may be enforced by the network based on so called PLMN codes and a tracking area (TA). The PLMN codes may comprise a Mobile Country Code (MCC) and a Mobile Network Code (MNC). The area where the UE is allowed a normal service can be limited on a per PLMN and/or per TA basis.

However, the principle of minimizing the PLMN coverage area across the country borders may be difficult to apply in some satellite deployments. The coverage area of a satellite cell can span a radius of hundreds of kilometers, causing the same cell (and consequently TA) to cover part of the land area of multiple countries.

3GPP TR 38.821 provides some examples of scenarios with wide-area coverage.

Figure 7:
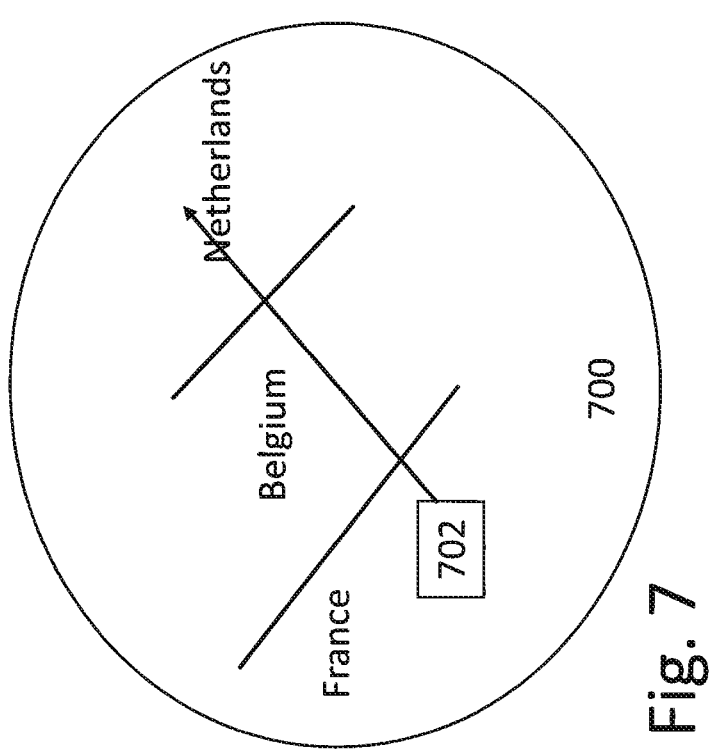
FIG. 7 schematically shows a single satellite cell covering three countries.

A so called static TA model has been suggested. In this model, the satellite cell projects a cell coverage area that appears static on the Earth surface. In the Static TA deployment model, the TA borders seem fixed when observed on the ground. However, due to the possibly large satellite cell coverage area, a single cell may span over multiple countries. In this regard, reference is made to the schematic representation of FIG. 7 where a single satellite cell 700 covers parts of France, Belgium and the Netherlands.

The 3GPP PLMN selection paradigm relies on the country code (MCC) part of the available PLMNs to inform the UE of its current country with sufficient accuracy. This principle of UE considering countries based on the available MCC codes generally works with terrestrial networks with limited coverage area (across the country borders), even in border areas.

However, a large coverage area of satellite cell would stretch the coverage area of a single satellite PLMN deep into other countries.

If a roaming user can remain registered in PLMN 1 of country A long after crossing the border to country B, it may cause one or more drawbacks.

For example there may be a roaming agreement violation, when PLMN 1 subscribers of country A can use in country B spectrum that is assigned to operators in country B.

Public Warning System (PWS) messages of a wrong area might be received by the UE.

Public Warning System (PWS) messages of the affected area might not be received by the UE Emergency calls need to be routed to the Public Safety Answering Point (PSAP) of the country of the user's location and this needs to be correct. The police from the neighbor country would not have any authority to operate "across the border".

Currently, a UE that has roamed to a VPLMN (visited PLMN) performs periodical background scans to check if a higher priority PLMN is available. A HPLMN is currently the highest priority PLMN. Thus a UE registered to a HPLMN currently does not need not perform any background scanning Consequently, a UE that crosses a border to other country while registered to its HPLMN will not initiate background scanning or PLMN selection for a local PLMN as long as it remains in HPLMN coverage area. In the case of satellite access, this coverage area may be relatively large. Some embodiments may address this issue or at least mitigate this issue.

A UE that has roamed to a VPLMN may experience restrictions in the way that further PLMN selections shall take place. Current restrictions are that the UE only considers other VPLMNs of the same country as the current RPLMN (registered PLMN) as determined by the MCC Consider the scenario illustrated by FIG. 7. A UE 702 registered for example in a French satellite network moves to Netherlands via Belgium. Using the existing procedure, the UE remains in the HPLMN coverage area for the whole journey and there is no need to select any other PLMN.

Currently, there is the concept of equivalent PLMNS. In the case that the UE has a stored a list of equivalent PLMNs, the UE only selects a PLMN if it is of a higher priority than those of the same country as the current serving PLMN which are stored in the equivalent PLMNs list. There is currently an additional MCC-based country restriction that applies on equivalent PLMNs. The UE only considers the priorities of the equivalent PLMNs in the same country.

There are many different ways in which the geo-location of a UE may be determined. This information may be available to the UE and/or the network. Some embodiments may use any one or more suitable methods in order to determine the geo-location of the UE. For example, a satellite positioning technique such as GPS technique may be used or any other suitable technique. UEs may use a mapping application to determine its geolocation. Alternatively or additionally the UE may use network based information to determine its location. Alternatively or additionally, the position of the UE may be determined by the network.

Embodiments may use any technique which allows the geo-position of the UE to be determined to the required accuracy. Some embodiments may require that the technique is robust enough to ensure that the UE is not attempt to cheat the system by registering to one countries network while in a different country.

When PLMN selection is limited to a certain country (e.g. for selecting the highest priority VPLMN), according to the present 3GPP requirements, the UE is mandated to consider PLMNs of the same country based on the MCC that is broadcast by the available networks. This means that the UEs determines its location are based on network topology. This approach works well when the PLMN coverage area is a reasonably good estimate of the country borders of the PLMN home country that corresponds to the PLMN's MCC. For satellite access with a large cell coverage area, this may be difficult for the reasons previously mentioned. Some embodiments may address one or more of these issues.

Some embodiments use the UE's geo-location to determine the PLMN selection. This contrasts with the approaches which use the network topological UE location to determine PLMN selection.

In some embodiments, the UE uses its awareness of its geo-location to limit its PLMN selection to PLMNs of the same country as the UE's present geo-location. If the UE moves to other country, then the UE will attempt to select a PLMN of that new country.

In some embodiments, this behavior may be used for a specific RAT (radio access technology) type. That RAT may be satellite access and/or any other suitable RAT type. In some embodiments, this modified behavior may be applied only for one type of RAT and the currently defined behavior or any other suitable behavior may be used for one or more other types of RAT.

In some embodiments, the network may enforce the UE's selection among the PLMNs (possibly on a per RAT type basis) in the UE's present geo-location country by rejecting a registration request if the UE is attempting to register to PLMN with MCC A when the UE's geo-location is actually in a country using MCC B.

Optionally, in some embodiments, the network may issue a recommended PLMN code or a list of recommended PLMNs for the UE to attempt registration to in priority order for the present UE location. If the coverage is provided by satellite and the network is aware of the availability and PLMN configuration of the satellites in the constellation, then the network may also additionally associate a validity time with the recommended PLMN(s) to tell the UE for how long the recommendation is valid.

Non-geostationary low (LEO) or medium (MEO) earth orbits may be sometimes used. They may have a lower delay caused by a lower altitude. They may be associated with cheaper operational costs. With such satellites, a stationary UE would move out of the coverage of a given serving cell over the course of time. The validity period may provide an indication of a length of time for which the UE is able to use that serving cell before the serving cell has moved such that the UE is no longer in that serving cell.

Other embodiments may alternatively or additionally use geostationary satellites. In those cases, a validity time may not be required.

Reference is made to FIG. 8 which shows a method of some embodiments.

This method may be used for an initial PLMN selection, in some embodiments. The method may alternatively or additional be used for PLMN selection in other scenarios.

In A1, apparatus of a UE determines or receive information relating to the geo-location of the UE. This geo-location will comprise at least country information.

In A2, the apparatus of the UE may perform PLMN selection. When performing PLMN selection, the apparatus of the UE may limit its selection to the available PLMNs of the country of the present UE geo-location. This means that if the UE is not in its home country but can still receive its HPLMN, the apparatus of the UE will select a VPLMN of the country in which the UE is physically located. In some embodiments this behavior may be specific to one or more particular RAT types. For example that particular RAT type may be satellite access.

Reference is made to FIG. 9, which shows a method performed by an apparatus of a UE.

The method may be used where a UE that is already registered to a RPLMN discovers that it has moved to a different country.

In B1, apparatus of a UE determines or receive information relating to the geo-location of the UE. This geo-location will comprise at least country information.

In B2, the apparatus of the UE determines that the country of the geo-location is different to the country of the PLMN to which the UE is currently joined.

In B3 the apparatus of the UE may select a new PLMN selection. When performing PLMN selection, the apparatus of the UE will limit its selection to the available PLMNs of the country of the present UE geo-location. In some embodiments this behavior may be specific to one or more particular RAT types. For example that particular RAT type may be satellite access.

The selection of a new PLMN may involve one or more exchanges with the network entity. For example, the apparatus of the UE may cause a request to be sent to the network entity indicating that the UE wants to change to a particularly PLMN. Alternatively the apparatus may cause a request to be sent to the network entity indicating that the UE would like to change PLMN. This may comprise an indication as to the reason for the request and/or information associated with the geo-location. The information associated with the geo-location may comprise country information such as the MCC. The network entity may provide a response. The response may comprise any of the information such as discussed in relation to C4 and/or C5 of Figure which is described below.

Thus in some embodiments, when the apparatus of the UE observes or determines that it has moved from the country of the current RPLMN to another country, then the apparatus of the UE may initiate PLMN selection. In this selection, the apparatus of the UE will only consider the available PLMNs of the country corresponding to the present geo-location of the user equipment. In some embodiments this behavior may be specific to one or more particular RAT types. For example that particular RAT type may be satellite access.

Reference is made to FIG. 10 which shows a method of some embodiments. C1, C5 and C6 may be performed in an apparatus of the UE. C2, C3 and C4 may be performed in an apparatus in a network entity.

In some embodiments, the method of FIG. 10 may be used for the network enforcement of the country-based PLMN selection. This method may be used during the first registration to the RPLMN. Alternatively or additionally this method may be at least partially used during a registration update. A registration update may be any suitable update and may for example be a mobility update or periodic update or any other suitable update. In some embodiments when a UE does a NAS (non access stratum) level registration, the core network can check whether it is from a legitimate geo-location.

In C1, the apparatus of the UE may be configured to cause a registration request to be sent to requesting registration with a PLMN. This may be when first registering with a network or when seeking to change from one PLMN to another or when performing an update with the same PLMN. This request may be sent to the network entity.

In C2, the apparatus of the network entity receives the registration request from the UE.

In C3, the apparatus of the network entity will determine if the UE has a geo-location in a country which is different the country of the PLMN. The apparatus of the network entity may have received the geo-location from the UE and/or have determined the geolocation of the UE and/or obtained the geo-location in any other suitable way. Where the geolocation of the UE is received from the UE, the geolocation may be part of the registration request or may be separately provided. In some embodiments, the network entity may simply be provided with the country of the geo-location of the UE.

In C4, when the apparatus of the network entity determines that that the country of the UEs geolocation is different to the country of the PLMN in the registration request, the apparatus is configured to cause a request rejection to be sent to the UE.

The request rejection may comprise an indication as to why the request is being rejected. In some embodiments the request rejection may indicate that the UE is attempting to register to the PLMN in wrong country.

In some embodiments, the request rejection provide country information such as the MCC in the registration rejection message. Alternatively or additionally this information may be provided in another message.

In some embodiments, the request rejection may comprise one or more candidate PLMNs which may be selected by the UE. It should be appreciated that the candidate PLMNs may be limited to those in the country corresponding the UE's geolocation. Alternatively or additionally this information may be provided in another message.

In some embodiments, where more than one candidate PLMN is provided, there may be a priority order indicated. Alternatively or additionally this information may be provided in another message.

In some embodiments, where more than one candidate PLMN is provided, one PLMN may be recommended. Alternatively or additionally this information may be provided in another message.

In some embodiments where one or more candidate or recommended PLMNs are provided, a validity period may be associated with one or more of the candidate PLMNs. Alternatively or additionally this information may be provided in another message.

In C5, the apparatus of the UE receives the request rejection. This may indicate to apparatus of the UE that the UE is to attempt to select another PLMN.

In C6, the apparatus of the UE selects a PLMN which is has the same country as the geo-location of the UE.

The apparatus of the UE may take into account the network indicated PLMN(s), if provided, when attempting to select a PLMN of the country corresponding to the current UE geo-location.

In some embodiments, where the network entity has provided the country information, for example the MCC, this may be without any candidate PLMNs. The apparatus of the UE may performs PLMN selection among the available PLMNs but limit the selection to the country indicated by the country information or MCC that was provided by the network in the rejection message.

In some embodiments, the selection of the PLMN may generally be in line with a usual priority order, except for the satisfaction of the country requirement. One example of a usual priority order is for example provided by TS 23.122, In some embodiments, the apparatus of the UE may use the one or more candidate PLMN(s), if provided in the rejection message or any other suitable message from the network entity, when selecting the PLMN.

In some embodiments, the apparatus of the UE may attempt to select a PLMN among the PLMNs indicated by the network. This may be provided in the registration rejection message and/or any other suitable messages. In some embodiments, the apparatus of the UE may attempt to select a PLMN with a highest priority among the PLMNs indicated by the network. All the candidate PLMN(s) may be for the country of the geo-location of the UE. In other embodiments, one or more candidate PLMNs may be associated with a country other than the country of the geo-location of the UE. In this case, the apparatus of the UE may be arranged to select a candidate PLMN associated with the same country as the geo-location of the UE.

In some embodiments, there is a validity period with the PLMN recommendation that the network entity provided to the UE. In some embodiments a validity period may be provided for two or more candidate PLMNS. In some embodiments the same validity period may apply to a plurality of candidate PLMNs. The apparatus of the UE may cause the UE to stop using the recommended PLMN at the end of the validity period. The validity period may be controlled by a timer. The validity period may expire when the timer expires.

Embodiments may be specific to a particular RAT type as mentioned previously. The RAT type may be a satellite RAT.

In some embodiments, a registration is a NAS procedure. In a 5G system, the network entity in FIG. 10 may be a AMF (access and mobility function). In a 4G system, the network entity in FIG. 10 may be a MME (mobility management entity). The radio access network may detects that the contents of a UE request is a NAS request, and sends the whole NAS envelope to the serving MME/AMF without opening the envelope.

In other embodiments, the network entity may be any other suitable entity.

The communication between the UE and the network entity may be via a radio access network in some embodiments.

In the above reference has been made to ensuring that the PLMN country and the geolocation type are the same. In other embodiments, other territorial requirements may apply. For example, the territorial requirement may apply to a group of two or more countries or any other territorial requirements. For example, the territorial requirement may be for part of a country. By way of example only, the territorial requirement may be that the PLMN is associated with the same island where the UE is geo-located.

In some embodiments, the apparatus of the UE is configured to periodically determine its geo-location. This may be using a mapping application or any other suitable technique. As part of the geo-location, the country may be determined. When the apparatus of the UE determines that the country has changed, this may cause the apparatus of the UE to trigger a re-registration process to change to a different PLMN.

In some embodiments, the apparatus of the UE may provide the MCC code associated with the country of the geo-location to the network entity. This may be compared with the MCC of the PLMN to determine if there is a discrepancy or to recommend one or more PLMNs.

The apparatus of the UE may determine or obtain its location before a registration or update procedure. This may be to ensure that it is still in the country with which the RPLMN is associated.

In some embodiments, an apparatus of the UE may alternatively or additionally verify its location before requesting a RRC (radio resource control) connection, to ensure it is accessing from the right country.

When a UE needs to register (for any reason), it first checks its geo-location. For example a UE when switched on in Finland only considers PLMNs that broadcast the Finnish MCC and ignore all Swedish, Norwegian and Russian PLMNs, if any, until crossing the border. When a selection needs to be made any way (for example for an update), that PLMN selection is limited to the available PLMNs in the country of the UE location.

In some embodiments the UE or the apparatus of the UE may uses its knowledge of geo-location to restrict its PLMN selection candidates to select a PLMN in its present country.

In some embodiments, the network entity or the apparatus of the network entity may use the knowledge of the UE's geolocation to enforce the UE's registration to the right country.

This may ensure that the does for example not attempt to register in an area where it is by law not allowed to use a satellite phone. After having moved to another country, under that country's legislation, the same user can be allowed to register by satellite.

Reference is made to FIG. 11 which show method performed by an apparatus in a user equipment. In D1, when a user equipment has moved from a first geographic territory to a second geographic territory, the method comprises causing the user equipment to move from a first public land mobile network associated with the first geographic territory to a second public land mobile network associated with the second geographic territory.

Reference is made to FIG. 12 which shows a method which may be performed in an apparatus of a network entity. In E1, when a user equipment has moved from a first geographic territory to a second geographic territory, the method comprises causing the user equipment to move from a first public land mobile network associated with the first geographic territory to a second public land mobile network associated with the second geographic territory.

Some embodiments may have the advantage at a UE is registered with a PLMN of the same country in which the UE is located.

Some embodiments may prevent or reduce roaming agreement violations, where PLMN 1 subscribers of country A can use in country B spectrum that is assigned to operators in country B.

Some embodiments may prevent or reduce the possibility of Public Warning System (PWS) messages of wrong area being received by the UE.

Some embodiments may prevent or reduce the possibility of Public Warning System (PWS) messages of the affected area not being received by the UE.

Some embodiments may prevent or reduce the possibility of emergency calls that being routed to the Public Safety Answering Point (PSAP) of a different country to that in which the UE is located.

Some embodiments may address the difficulties with ensuring that the UE geo-location country is the same as that of the PLMN in the case of satellite communications where the cells may be big enough to cover two or more countries.

It is noted that while the above describes example embodiments, there are several variations and modifications which may be made to the disclosed solution without departing from the scope of the present invention. In particular, different embodiments have been described. Different features from different embodiments may be combined.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method procedures previously described. That circuitry may be provided in the network entity and/or in the communications device.

As used in this application, the term "circuitry" may refer to one or more or all of the following:
   (a) hardware-only circuit implementations (such as implementations in only analogue and/or digital circuitry);
   (b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or network entity to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A user equipment comprising:

at least one processor; and at least one memory including computer codes stored therein for one or more programs, the computer codes being configured to, when executed by the at least one processor, cause the user equipment to perform operations, the operations comprising at least:

sending, to a first public land mobile network associated with a first country, a first request to register with the first public land mobile network;

receiving, from a network entity of the first public land mobile network, a request rejection message indicating rejection of the first request, the request rejection message comprising an indication of why the first request was rejected, wherein said indication indicates that the user equipment is attempting to register with a public land mobile network associated with the first country while the user equipment is located in a second country, the second country being different from the first country;

in response to receiving the request rejection message and in an instance in which the indication indicates that the first request was rejected because the first public land mobile network is associated with the first country while the user equipment is located in the second country, selecting a second public land mobile network associated with the second country; and sending, to the second public land mobile network associated with the second country, a second request to register with the second public land mobile network.

2. The user equipment as claimed in claim 1, wherein the request rejection message comprises second country information for the second country.

3. The user equipment as claimed in claim 2, where the second country information comprises a mobile country code for the second country.

4. The user equipment as claimed in claim 2, wherein the selecting comprises selecting the second public land mobile network associated with the second country using said second country information.

5. The user equipment as claimed in claim 1, wherein the request rejection message comprises one or more candidate public land mobile networks in the second country.

6. The user equipment as claimed in claim 5, wherein said selecting the second public land mobile network comprises selecting, as the second public land mobile network, a candidate public mobile network from among the one or more candidate public land mobile networks.

7. The user equipment as claimed in claim 6, wherein the one or more candidate public land mobile networks are each associated with priority information, and wherein said selecting comprises selecting, from among the one or more candidate public land mobile networks, as the second public land mobile network, the candidate public land mobile network that has a highest priority.

8. The user equipment as claimed in claim 5, wherein the operations further comprise:

receiving validity information indicating a validity time period associated with at least one of the one or more candidate public land mobile networks.

9. The user equipment as claimed in claim 8, wherein the second public land mobile network is associated with the validity information, and wherein the operations further comprise;

stopping use of the second public land mobile network at an end of the validity time period associated with the validity information for the second public land mobile network.

10. The user equipment as claimed in claim 1, wherein access to at least one of the first public land mobile network or the second public land mobile network is via a satellite access.

11. A method comprising:

sending, by a user equipment, to a first public land mobile network associated with a first country, a first request to register with the first public land mobile network;

receiving, at the user equipment, from a network entity of the first public land mobile network, in response to the first request to register with the first public land mobile network, a request rejection message indicating rejection of the first request, the request rejection message comprising an indication of why the first request to register with the first public land mobile network was rejected, wherein the indication comprises an indication that the user equipment is attempting to register with a public land mobile network associated with the first country while the user equipment is located in a second country, the second country being different from the first country;

in response to receiving the request rejection message and in an instance in which the indication indicates that the user equipment is attempting to register with the first public land mobile network associated with the first country while the user equipment is located in the second country that is different from the first country, selecting a second public land mobile network associated with the second country; and sending, by the user equipment, to the second public land mobile network associated with the second country, a second request to register with the second public land mobile network.

12. The method as claimed in claim 11, wherein the request rejection message comprises second country information for the second country.

13. The method as claimed in claim 12, wherein the selecting the second public land mobile network associated with the second country is based at least on said second country information.

14. The method as claimed in claim 12, where the second country information comprises a mobile country code for the second country.

15. The method as claimed in claim 11, wherein the request rejection message comprises one or more candidate public land mobile networks associated with the second country.

16. The method as claimed in claim 15, wherein said selecting the second public land mobile network comprises selecting, from among the one or more candidate public land mobile networks associated with the second country, a candidate public land mobile network as the second public land mobile network.

17. The method as claimed in claim 16, wherein the one or more candidate public land mobile networks are each associated with priority information, and wherein said selecting comprises selecting, from among the one or more candidate public land mobile networks, the candidate public land mobile network that has a highest priority as the second public land mobile network.

18. The method as claimed in claim 17, further comprising:

receiving, at the user equipment, validity information indicating a validity time period associated with at least one of the one or more candidate public land mobile networks.

19. The method as claimed in claim 18, wherein the second public land mobile network is associated with said validity information, and wherein the method further comprises:

stopping use of the second public land mobile network at an end of a validity time period indicated in the validity information.

20. The method as claimed in claim 11, wherein access to at least one of the first public land mobile network or the second public land mobile network is via a satellite access.

21. A non-transitory computer-readable storage medium comprising instructions stored therein which, when executed by at least one processor of a user equipment, cause the user equipment to perform at least:

sending, to a first public land mobile network associated with a first country, a first request to register with the first public land mobile network;

receiving, from a network entity of the first public land mobile network, a request rejection message comprising a rejection of the first request and an indication of why the first request was rejected, wherein the indication comprises an indication that the user equipment is attempting to register with a public land mobile network associated with the first country while the user equipment is located in a second country, the second country being different from the first country;

in response to receiving the request rejection message and in an instance in which the indication indicates that the request was rejected because the first public land mobile network is associated with the first country while the user equipment is located in the second country, selecting a second public land mobile network associated with the second country; and sending, to the second public land mobile network associated with the second country, a second request to register with the second public land mobile network.

* * * * *